(12) United States Patent
Craske

(10) Patent No.: US 7,711,882 B2
(45) Date of Patent: May 4, 2010

(54) INTERRUPT JITTER SUPPRESSION

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 15 days.

(21) Appl. No.: 12/285,599

(22) Filed: Oct. 9, 2008

(65) Prior Publication Data

US 2009/0132744 A1 May 21, 2009

(30) Foreign Application Priority Data

Nov. 21, 2007 (GB) ................... 0722827.3

(51) Int. Cl.
*G06F 13/24* (2006.01)
(52) U.S. Cl. ...................... 710/265; 710/267
(58) Field of Classification Search ......... 710/260–269
See application file for complete search history.

(56) References Cited

U.S. PATENT DOCUMENTS 6,338,111 B1 * 1/2002 Stevens ...................... 710/260
6,757,771 B2 * 6/2004 Christie ...................... 710/260
7,039,738 B2 * 5/2006 Plummer et al. ............ 710/260

FOREIGN PATENT DOCUMENTS

GB 2411023 8/2005

OTHER PUBLICATIONS

UK Search Report for GB0722827.3 dated Mar. 20, 2008.

* cited by examiner

*Primary Examiner*—Raymond N Phan
(74) *Attorney, Agent, or Firm*—Nixon & Vanderhye P.C.

(57) ABSTRACT

A data processing apparatus comprises a processing unit which is responsive to a plurality of interrupt signals to carry out a corresponding interrupt routine. On receipt of an interrupt signal, the processing unit stores data values from a plurality of registers onto a data stack and carries out the corresponding interrupt routine. Thereafter the processor returns the data values from the data stack to the registers and carries on the processing it was performing when the interrupt was received. If a higher priority interrupt is received whilst the processor is transferring register values to or from the data stack, that transferral is abandoned and the processing unit immediately begins transferring data values from the registers to the data stack in response to the higher priority interrupt.

18 Claims, 14 Drawing Sheets

INTERRUPT JITTER SUPPRESSION

CROSS REFERENCE TO RELATED APPLICATION

This application is claims the benefit of British Patent Application No. 0722827.3 filed on 21 Nov. 2007, incorporated herein by reference in its entirety.

BACKGROUND OF THE INVENTION

1. Field of the Invention

The present invention relates to data processing units responsive to interrupt signals to carry out a corresponding interrupt routine.

2. Description of the Prior Art

In a data processing apparatus which is responsive to an interrupt signal to carry out a corresponding interrupt routine, variations in the time taken to respond to an interrupt (i.e. the time between the interrupt signal being asserted and when the first instruction of the corresponding interrupt routine is executed) can be problematic in real time systems. These problems may be particularly serious in relation to high priority interrupts, to which it is desirable that the data processing apparatus responds in a swift and predictable manner.

It is known that data processing apparatuses may use a stack based exception model when responding to an interrupt. In such models, on receipt of an exception or interrupt signal, the processing unit is configured to store a set of data values indicative of the current state of the processor (typically this being the contents of a set of registers within the processing unit) on a data stack. On completion of the interrupt routine triggered by the interrupt signal, the processing unit then retrieves the set of data values from the data stack, in order to continue program execution at the point where the interrupt signal was received. Such a stack based exception model may be atomic and un-interruptable, i.e the stacking/unstacking process must be wholly completed before the processing unit can perform any other activity. This has the advantage of preserving the coherency of the set of data values indicating the processor state, but may also worsen "interrupt jitter" by increasing the worst case interrupt response time. Alternatively, the stack based exception model may be interruptable, allowing a higher priority interrupt to disrupt an ongoing stacking/unstacking process, providing the necessary additional mechanisms to cope with the part-stacked/unstacked data stack. This may for example be carried out by allowing a higher priority interrupt to step in on a stacking process commenced by a lower priority interrupt, simply continuing that stacking process until the full set of data values has been transferred to the data stack and then commencing the interrupt routine corresponding to the higher priority interrupt. Since, relative to when the higher priority interrupt was received, the first instruction of the interrupt routine corresponding to the higher priority interrupt begins execution sooner than if that higher priority interrupt had been received in isolation, this worsens interrupt jitter by offering a lower than normal interrupt response time.

Accordingly, it would be desirable to provide a technique which enabled greater consistency in interrupt response times.

SUMMARY OF THE INVENTION

Viewed from a first aspect, the present invention provides a data processing apparatus comprising: a processing unit for processing data; a plurality of registers; and a data stack; said processing unit being responsive to each of a plurality of interrupt signals to carry out a corresponding interrupt routine; wherein on receipt of an interrupt signal, said processing unit is configured to begin an interrupt entry stacking process comprising storing on said data stack a plurality of data values indicative of a state of said processing unit stored in said plurality of registers; wherein on completion of an interrupt routine, said processing unit is configured to begin an interrupt exit unstacking process comprising returning said plurality of data values from said data stack to said plurality of registers; wherein in response to a further higher priority interrupt signal received whilst performing either said interrupt entry stacking process or said interrupt exit unstacking process, said processing unit is configured to abandon said interrupt entry stacking process or said interrupt exit unstacking process, and to begin a further interrupt entry stacking process comprising storing on said data stack a further plurality of data values stored in said plurality of registers.

The present technique recognises that in some circumstances the performance penalty associated with variations in interrupt response times is worse than the performance penalty associated with not allowing interrupt response times to be, on occasion, as short as possible. Thus, the data processing apparatus of the present invention provides that if a higher priority interrupt signal is received whilst already performing either an interrupt entry stacking process or an interrupt exit unstacking process, the processing unit is configured to abandon that stacking/unstacking process, and to begin a further interrupt entry stacking process for the higher priority interrupt signal. In this way, whenever a higher priority interrupt signal is received the same, full interrupt entry stacking process is carried out, whether or not the higher priority interrupt is received whilst handling a lower priority interrupt. This greatly reduces variation in the interrupt response time for that higher priority interrupt signal.

It will be appreciated that the data stack could be implemented in a variety of ways, but in one embodiment the data stack is a dedicated first-in last-out buffer. This arrangement is an advantageously simple way of implementing this component. However, in other embodiments the data processing apparatus further comprises a memory and the data stack is embodied in a portion of that memory. This provides greater flexibility in how the data stack is implemented, in particular providing greater storage space for the data stack to extend into when necessary.

Whilst the data stack could be simply implemented as a strict "stack" in a simple first-in last-out manner, in embodiments the data processing apparatus further comprises a data stack pointer register for storing a data stack pointer indicative of a current top of the data stack. This allows greater flexibility in defining the current top of the data stack, for example allowing the possibility of ignoring/invalidating a set of data values stored on top of the data stack by defining the current top of the data stack at a point below those values.

In one embodiment the plurality of data values stored on the data stack comprises a data stack frame and the interrupt entry stacking process further comprises storing additional values in association of the plurality of data values stored on the data stack, the additional data values being indicative of a data stacked framed validity. By grouping the plurality of data values together as a data stack frame and further including additional data values indicating data stack frame validity, a set of data values indicative of the state of the processing unit may be easily identified as either valid or invalid.

In some situations a data stack frame may be known to be invalid while it is being stored on the data stack and in this case the additional data values indicative of data stack frame validity indicate the validity of the data stack frame in which they are found. Alternatively, a data stack frame's validity may change after it has been stored on the data stack, and in this case its validity may be indicated by the next data stack frame, hence the additional data values indicative of data stack frame validity indicate the validity of an adjacent data stack frame adjacent to the data stack frame in which those additional data values are found. Providing additional data values indicating an invalid data stack frame are particularly useful. Since the data stack frame is marked as invalid, when the processing unit unstacks values from the data stack, these invalid data stack frames can be ignored and in one embodiment the processing unit is operable during the interrupt exit unstacking process to skip an invalid data stack frame.

Whilst the additional data values indicative of data stack frame validity could refer to a full data stack frame, they may also indicate an incomplete data stack frame and in one embodiment the processing unit is operable during the interrupt exit unstacking process to skip an incomplete data stack frame.

It will be appreciated that when the processing unit abandons an interrupt entry stacking process to begin a further interrupt entry stacking process, the processing unit could begin said further interrupt entry stacking process at a variety of points in the data stack, but in one embodiment the processing unit is operable to begin the further interrupt entry stacking process at a point in the data stack which the interrupt entry stacking process had reached when the further higher priority interrupt signal was received. This allows the processing unit to simply commence a new data stack frame for the higher priority interrupt at the point on the data stack it has just reached, storing additional data values within that new data stack frame to indicate that the interrupted data stack frame is incomplete. In an alternative embodiment the processing unit is operable to begin the further interrupt entry stacking process at a point in the data stack where the interrupt entry stacking process began. Thus the processing unit simply returns to the point on the data stack where the interrupt entry stacking process triggered by the low priority interrupt began, storing the plurality of data values on the data stack as if the preceding low priority interrupt had never been received.

In one embodiment, in the situation where the higher priority interrupt is received during an interrupt exit unstacking process, the processing unit is operable to begin the further interrupt entry stacking process at a point in the data stack where the interrupt exit unstacking process began. This then leaves the set of data values that the interrupt exit unstacking process was part way handling in place on the data stack for later unstacking. Since the further interrupt entry stacking process began part way through an interrupt exit unstacking process, the set of values stored in the processing unit are in an indeterminate state and thus the data values stored on the data stack by the further interrupt entry stacking process are invalid. This may be indicated by storing additional data values in association with the data values stored by the further interrupt entry stacking process indicating that this newest data stack frame is invalid. Alternatively in another embodiment, on completion of the further interrupt entry stacking process, if the further higher priority interrupt signal was received whilst performing an interrupt exit unstacking process, the processing unit is configured to alter the data stack pointer to indicate the point where the further interrupt entry stacking process began. By this simple mechanism, once the interrupt routine corresponding to the higher priority interrupt has completed, the processing unit begins unstacking the data values from the data stack ignoring the invalid data stack frame initiated by the higher priority interrupt and unstacking the data values corresponding to the previous, valid, lower priority interrupt.

In a further embodiment, on completion of the further interrupt entry stacking process, if the further higher priority interrupt signal was received whilst performing an interrupt entry stacking process, the interrupt entry stacking process having resulted from a preceding higher priority interrupt signal having been received whilst performing the interrupt exit unstacking process, the processing unit is configured to alter the data stack pointer to indicate where the further interrupt entry stacking process began. This is necessary because despite the further higher priority interrupt signal having been received whilst performing an interrupt entry stacking process the data stack frame created on the data stack in response to the further higher priority interrupt signal is nevertheless invalid because the preceding higher priority interrupt signal was received part-way through an interrupt exit unstacking process. Thus it is required that when the interrupt routine corresponding to the latest, highest priority interrupt signal completes that the processing unit begins unstacking the data stack ignoring the invalid data stack frames created by the higher priority interrupt signals.

It will be appreciated that the interrupt signal could come from variety of sources. In one preferred embodiment the interrupt signal is generated externally to the processing unit, for example being a reset, IRQ or FIQ signal. In other embodiments the interrupt signal is generated as a direct effect of processing data, such as software interrupts, undefined instructions or prefetch aborts. In still further embodiments the interrupt signal is generated as a side effect of processing data, such as resulting from a data abort exception.

Viewed from a second aspect the present invention provides a method of operating a data processing apparatus, comprising the steps of: processing data using a processing unit having a plurality of registers; responding to each of a plurality of interrupt signals to carry out a corresponding interrupt routine; on receipt of an interrupt signal, said processing unit beginning an interrupt entry stacking process comprising storing on a data stack a plurality of data values indicative of a state of said processing unit stored in said plurality of registers; on completion of an interrupt routine, said processing unit beginning an interrupt exit unstacking process comprising returning said plurality of data values from said data stack to said plurality of registers; in response to a further higher priority interrupt signal received whilst performing either said interrupt entry stacking process or said interrupt exit unstacking process, said processing unit abandons said interrupt entry stacking process or said interrupt exit unstacking process, and begins a further interrupt entry stacking process comprising storing on said data stack a further plurality of data values stored in said plurality of registers.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
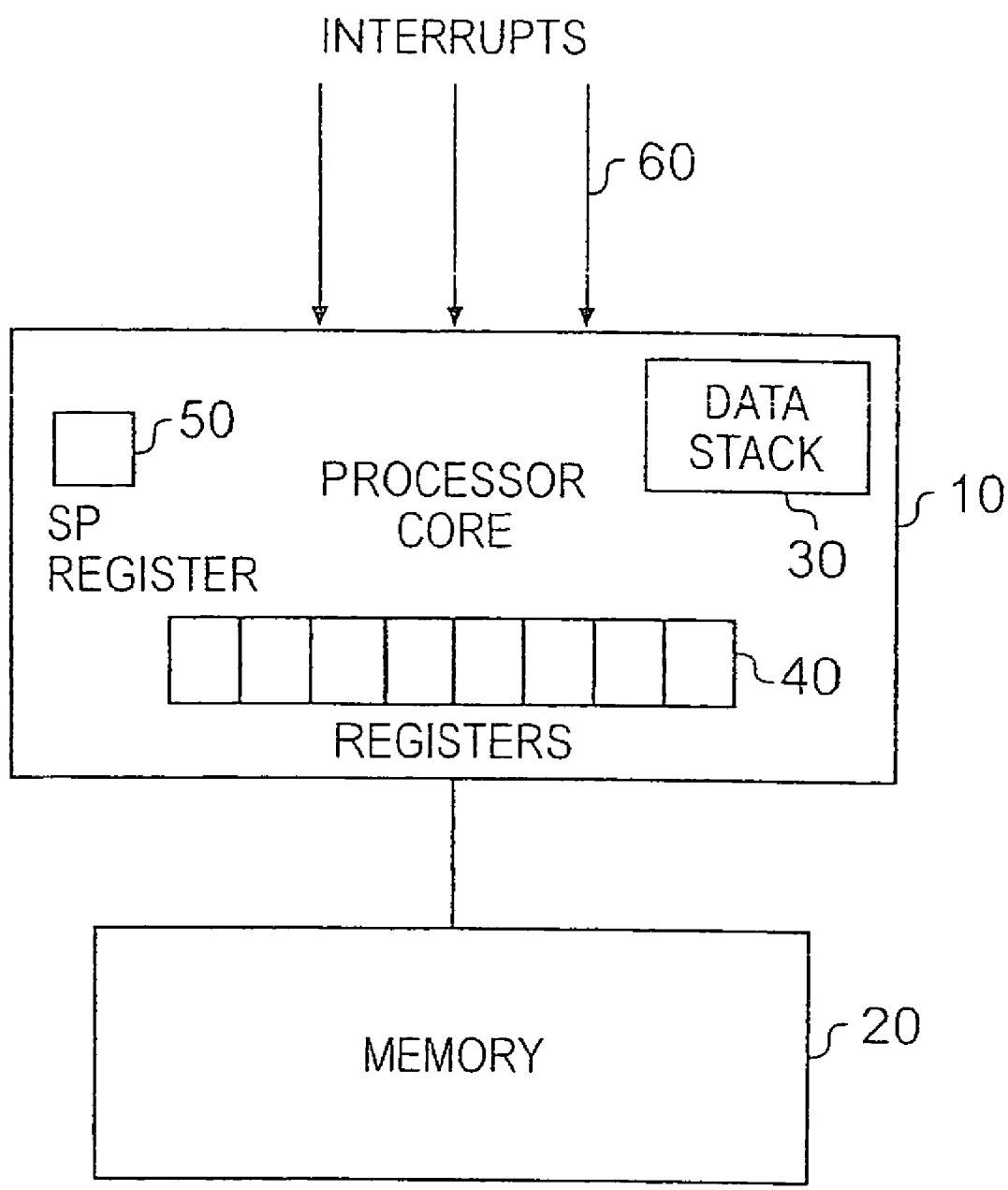
FIG. 1 schematically illustrates a data processing apparatus.

FIG. 1 illustrates a processor core 10 connected to a memory 20. Processor 10 contains a data stack 30, a set of registers 40 and a stack pointer (SP) register 50. During normal data processing operations the activities of the processor core 10 are directed by the values stored in the registers 40, for example one of these values will typically be the program counter (PC) indicating the current memory address from which an instruction is being read. In addition, processor core 10 can receive interrupt signals over inputs 60. On receipt of an interrupt signal the processor core 10 is configured to carry out an interrupt service routine (ISR), also referred to herein as an "interrupt routine", having first performed an interrupt entry stacking process comprising storing on the data stack 30 the set of data values stored in registers 40. The recording of this processor core state information in this way allows the processor core 10 to return to the point in its processing activities where it left off when the interrupt signal was received. Whilst in the illustrated embodiment the data stack 30 is a dedicated component of the processor core in alternative embodiments the data stack could be embodied in a series of memory locations in memory 20. The processor core 10 also contains SP register 50 which contains a pointer to the current top of the data stack, indicating the "uppermost" valid item of data stored on the data stack (the term "uppermost" is used to denote the newest data item on the stack, and thus a data stack implemented as a descending stack will have newer data items added at lower memory addresses. In this case, the "uppermost" valid item of data then is at the lowest valid address on the data stack).

When the interrupt entry stacking process has been completed the program counter (PC) of the processor core jumps to a vector address corresponding to a particular interrupt signal received. This vector address gives the start location for a corresponding interrupt routine to be carried out on receipt of the interrupt. Then, on completion of the interrupt routine the processing unit is configured to begin an interrupt exit unstacking process comprising returning the set of data values from the data stack 30 to the registers 40. The processor core's activities then continue from the point they had reached when the interrupt signal was received. If however, the processor core 10, whilst performing either an interrupt entry stacking process or an interrupt exit unstacking process, receives a further interrupt signal over inputs 60, which is of higher priority than the first interrupt signal then the processor core 10 is configured to abandon the interrupt entry stacking process or interrupt exit unstacking process, and to begin a further interrupt entry stacking process in response to the newer higher priority interrupt signal. If, on the other hand the newer interrupt signal is deemed to be of lower priority then the interrupt signal currently being serviced by the processor core, then the later interrupt signal remains pending until the earlier higher priority interrupt signal has been fully dealt with (i.e. its interrupt routine has been performed).

Figure 2:
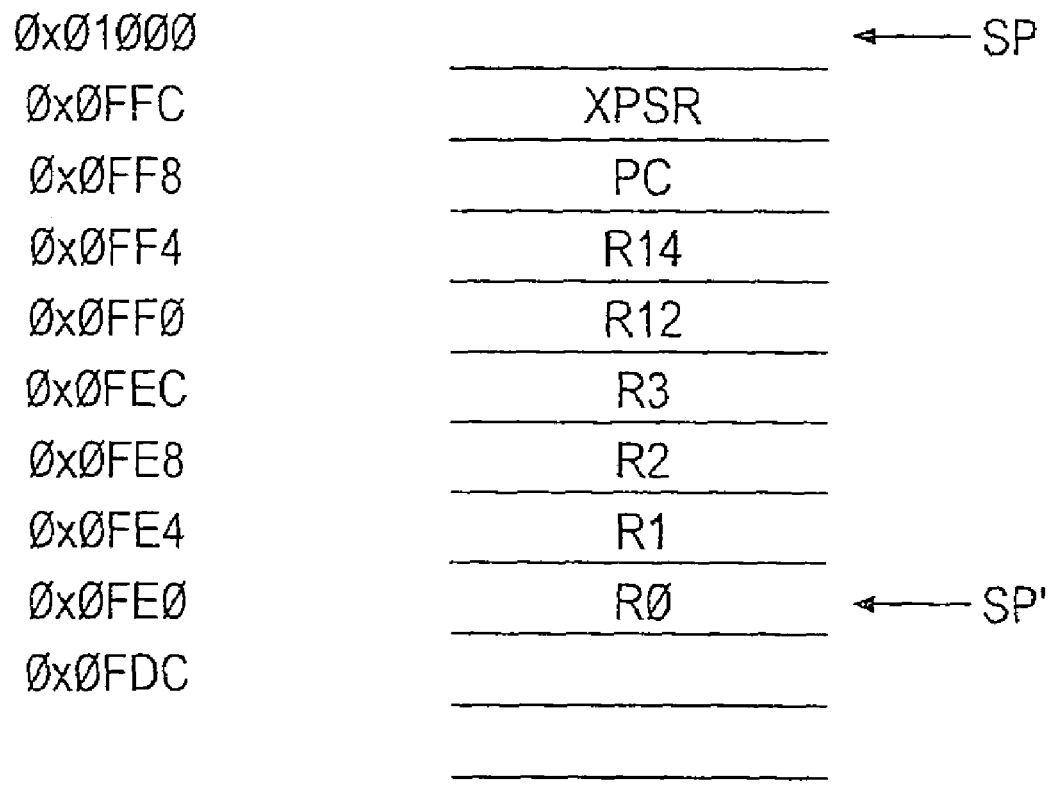
FIG. 2 schematically illustrates a set of data values stored on a data stack.

An example data stack is illustrated in FIG. 2. This data stack is embodied in memory 20 and the portion of the data stack illustrated covers memory addresses from 0x0FDC to 0x01000. This example data stack grows towards lower memory addresses and has a stack pointer pointing to the last item written to the data stack (commonly known as a "full descending stack"). Thus, in the data stack illustrated in FIG. 2 the previous use of the data stack has filled the data stack to memory address 0x01000 to which stack pointer SP points. When an interrupt signal is received on input 60 the processor core 10 begins an interrupt entry stacking process storing on the data stack the set of values in registers 40. Such a set of register values stored on the data stack is also referred to as a "data stack frame". These register values are illustrated in FIG. 2 by their register labels XPSR, PC, R14, R12, R3, R2, R1 and R0. Thus, once this set of data values has been stored on the data stack the revised stack pointer SP' then points to memory address 0x0FE0. In the interrupt entry stacking process the register values are stored sequentially on the data stack, although this need not be in strict memory address order. For example, in one embodiment the register values are in fact transferred in the order: PC, XPSR, R0, R1, R2, R3, R12 and finally R14, nevertheless being stored in positions on the data stack as illustrated in FIG. 2.

In the following discussions, referring to FIGS. 3A, 4A, 4C, 5A, 5C and 5E, an example embodiment is described in which the register values are stacked on the data stack in sequential order following the order illustrated downwards in FIG. 2. Furthermore, whilst stacking/unstacking the SP is continually updated to point to the last value stacked onto/unstacked from the data stack. This approach is referred to herein as "incremental data value stacking".

By constrast, in what follows, referring to 3B, 4B, 4D, 5B, 5D and 5F, an example embodiment is described in which the register values are transferred onto the data stack in the order: PC, XPSR, R0, R1, R2, R3, R12 and finally R14, nevertheless being stored in positions on the data stack as illustrated in FIG. 2 (as mentioned above). In this embodiment the SP is updated at the beginning of interrupt entry stacking process (and at the end of an interrupt exit unstacking process) to correspond to its position once the stacking/unstacking has completed. This approach is referred to herein as "frame-by-frame stacking".

The situations illustrated in FIGS. 3A, 4A, 4C, 5A, 5C and 5E ("incremental data value stacking") correspond to the situations illustrated in FIGS. 3B, 4B, 4D, 5B, 5D and 5F ("frame-by-frame stacking"), respectively. It should be noted that in all of these figures, the addresses (1, 2, 3, etc.) and times (A, B, C, etc.) are arbitrary labels and should not be viewed as necessarily equally spaced in either memory space or time.

Figure 3A:
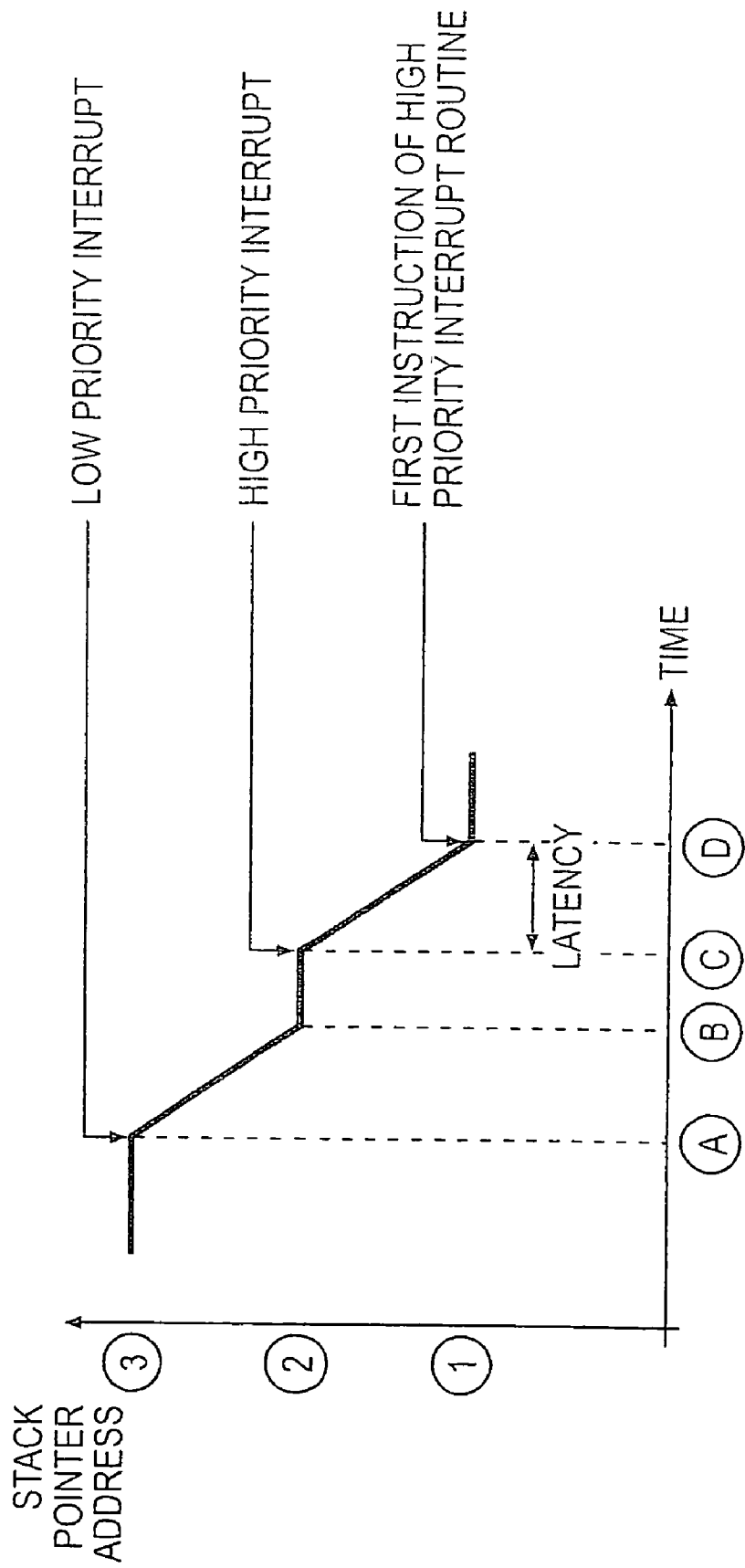
FIGS. 3A and 3B are time graphs schematically illustrating the development of a data stack when a low priority interrupt is followed by a high priority interrupt.
Figure 3B:
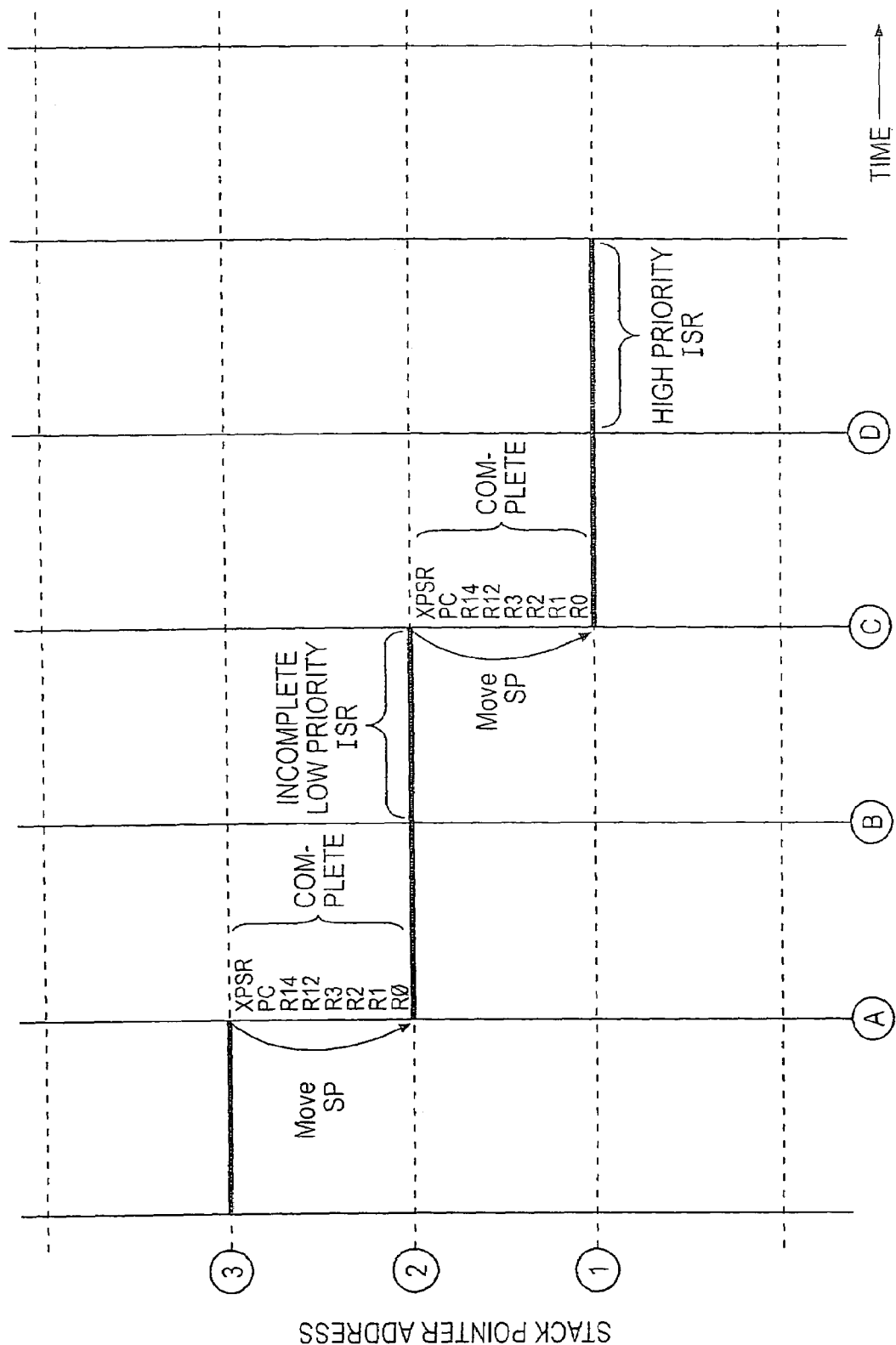

FIGS. 3A and 3B thus illustrate the progression of the stack pointer address over a period of time when a lower priority interrupt is shortly followed by a higher priority interrupt. At time A, when the SP points to memory address 3, a low priority interrupt is received by processor core 10 initiating an interrupt entry stacking process during which the contents of registers 40 are stacked on the data stack. In FIG. 3A, the SP thus moves from memory address 3 to memory address 2 over the course of the interrupt entry stacking process. In FIG. 3B, the SP is thus moved from memory address 3 to memory address 2 immediately prior to the interrupt entry stacking process.

The interrupt entry stacking process completes at time B, when the interrupt routine corresponding to the low priority interrupt is started, but shortly afterwards, before it has time to complete, at time C a high priority interrupt is received by processor core 10. This initiates a new interrupt entry stacking process by the end of which (incrementally in FIG. 3A/in one initial step in FIG. 3B) at time D the SP is at memory address 1. The interrupt routine corresponding to the high priority interrupt then begins. Thus, it can be seen (in FIG. 3A) that the interrupt latency for the high priority interrupt, i.e. the time between the high priority interrupt being received and the first instruction of the high priority interrupt routine being executed, is the time between time points C and D. This interrupt latency represents the time taken for the register values to be stacked on the data stack and should be relatively constant if the high priority interrupt is received whilst the processor core is executing instructions rather than stacking register values on the data stack. However, were the processor core to receive the high priority interrupt whilst performing an interrupt entry stacking process for a lower priority interrupt, then significant variation in this interrupt latency could result, if the interrupt entry stacking process initiated by the low priority interrupt were allowed to complete, either then immediately starting the interrupt routine corresponding to the high priority interrupt (thus shortening the high priority interrupt latency) or only then commencing a new interrupt entry stacking process for the high priority interrupt (thus increasing the interrupt latency for the high priority interrupt).

Figure 4A:
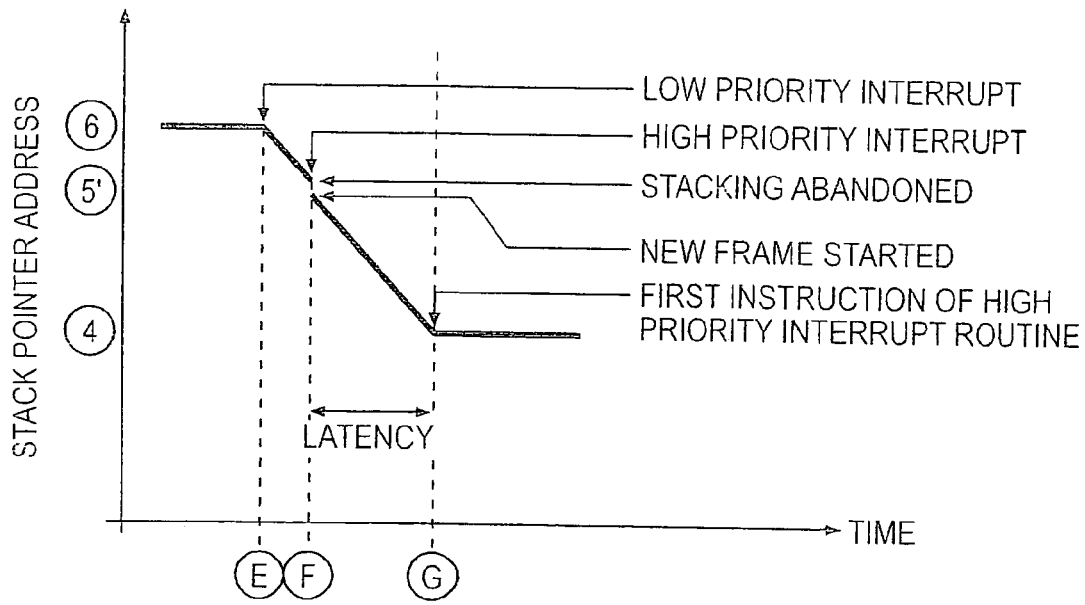
FIGS. 4A, 4B, 5A and 5B are time graphs schematically illustrating the development of a data stack when a high priority interrupt occurs during a stacking process initiated by a low priority interrupt.

Such variations in the interrupt latency for a high priority interrupt may be avoided by the techniques of the present invention. The progress over time of the stack pointer in one embodiment of the invention is illustrated in FIGS. 4A/B and 4C/D. In FIGS. 4A and 4B a high priority interrupt is received by processor core 10 whilst the interrupt entry stacking process initiated by a low priority interrupt is still in progress. The low priority interrupt is received at time E when the stack pointer points to memory address 6. Shortly afterwards, at time F before the interrupt entry stacking process has completed a high priority interrupt is received by processor core 10. At this point the transferral of data values to the data stack is only partly complete. In the example of FIG. 4A, this can be seen by the stack pointer having only reached memory address 5'. In the example of FIG. 4B, it can be seen that only the values XPSR, PC and R0 have been transferred. The processor core then abandons the interrupt entry stacking process initiated by the low priority interrupt and immediately starts a new interrupt entry stacking process initiated by the high priority interrupt. This involves re-starting stacking the register values from registers 40 onto the data stack. In the example of FIG. 4A, this is from memory address 5'. In the example of FIG. 4B, this is from memory address 5.

Thus it can be seen (in particular from FIG. 4A) that the interrupt latency for the high priority interrupt in this situation (from time F to time G) in this is the same as the interrupt latency shown in FIG. 3A (from time C to time D).

In addition, the processor core makes use of unused space in one of the 32-bit register values (e.g. in XPSR or PC) to store additional data values which indicate that the stack frame above is incomplete and thus does not form a valid data stack frame. Thus, when the interrupt routine corresponding to the high priority interrupt (which begins at time G) completes and the processor core unstacks the set of register values upwards from address 4, it is recognised that the register values immediately above this set form an incomplete data stack frame (i.e. an incomplete set of register values) and these can be ignored. This is illustrated in FIG. 4B, whereby when the unstacking reaches address 5, the SP skips to address 6.

It will be appreciated that in the example illustrated in FIG. 4B, the additional data values indicating that the data stack frame above is incomplete need only indicate "incomplete/invalid data stack frame above", and the processor then knows to simply skip the SP by a frame (i.e. in the examples discussed herein, by 8 memory addresses). For the example illustrated in FIG. 4A, the additional data values indicating that the data stack frame above is incomplete need also to indicate how many memory addresses above correspond to the incomplete data stack frame. For example, where the incomplete interrupt entry stacking process had only stacked XPSR, PC and R14 by the time the higher priority interrupt was received, then the additional data values must indicate that three memory addresses above the current data stack frame are to be skipped.

Figure 4C:
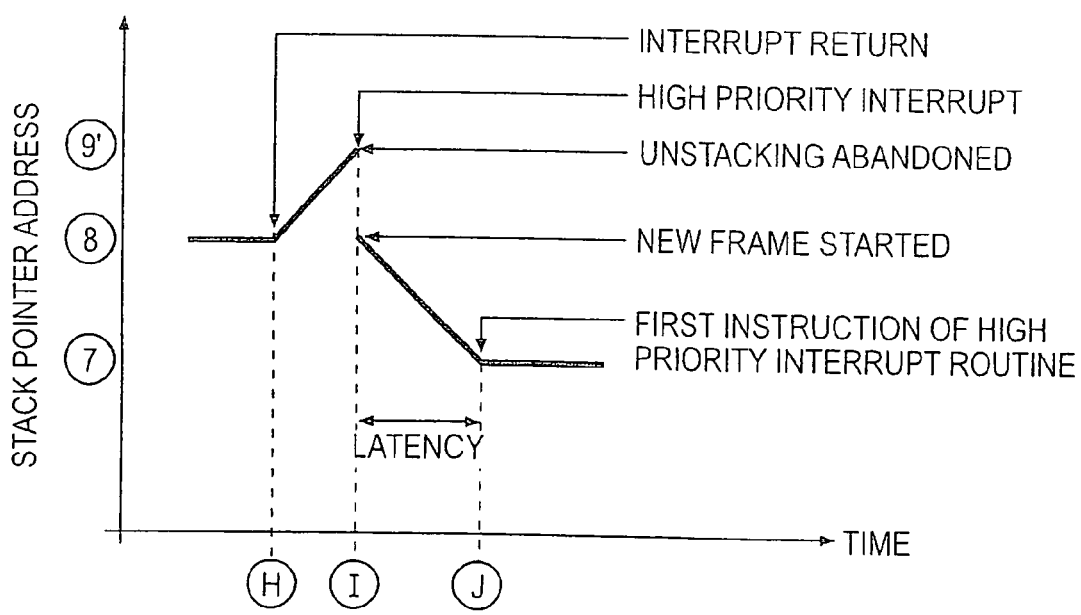
FIGS. 4C, 4D, 5C and 5D are time graphs schematically illustrating the development of a data stack when a high priority interrupt is received during an unstacking processing initiated by a low priority interrupt.
Figure 4B:
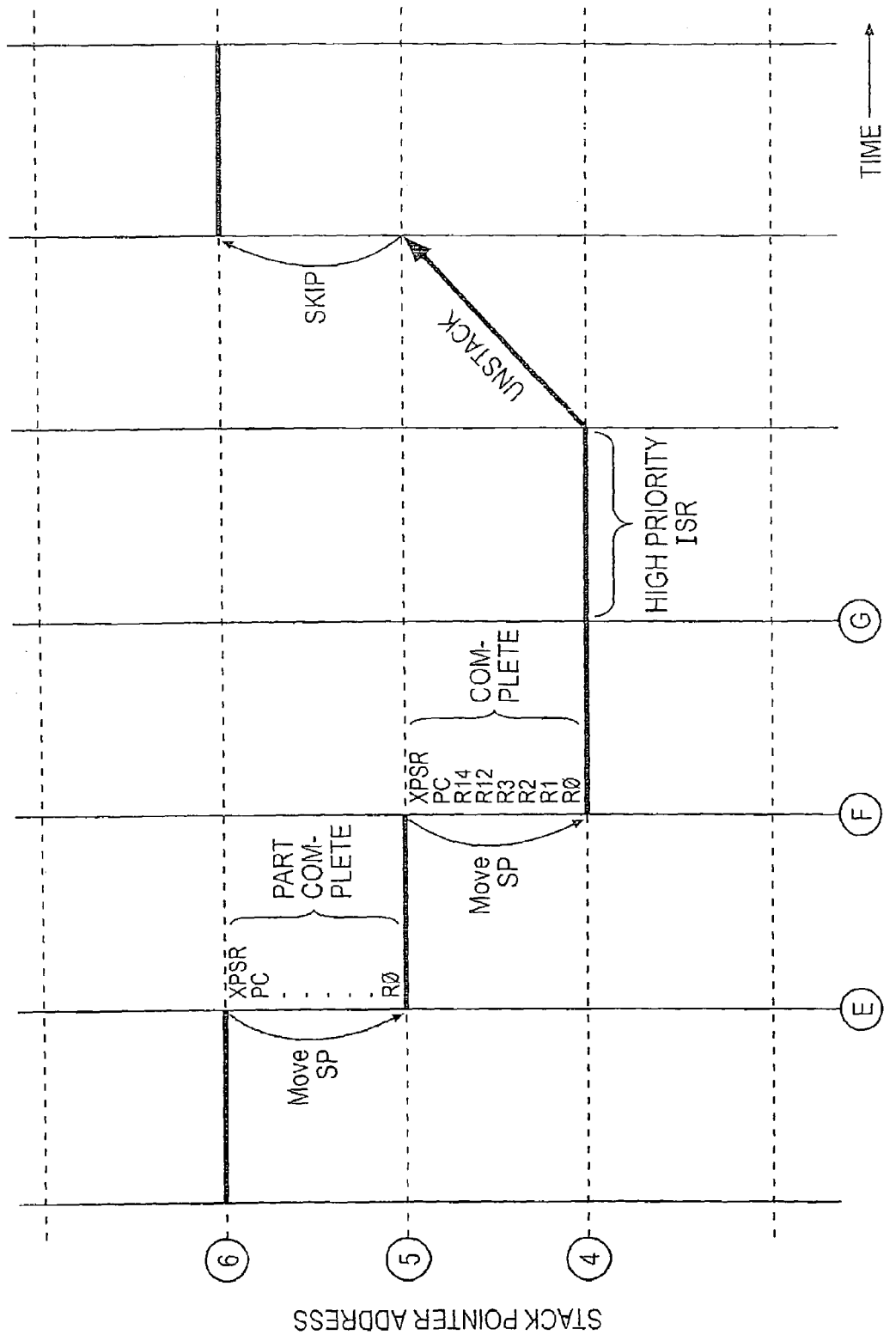
Figure 4D:
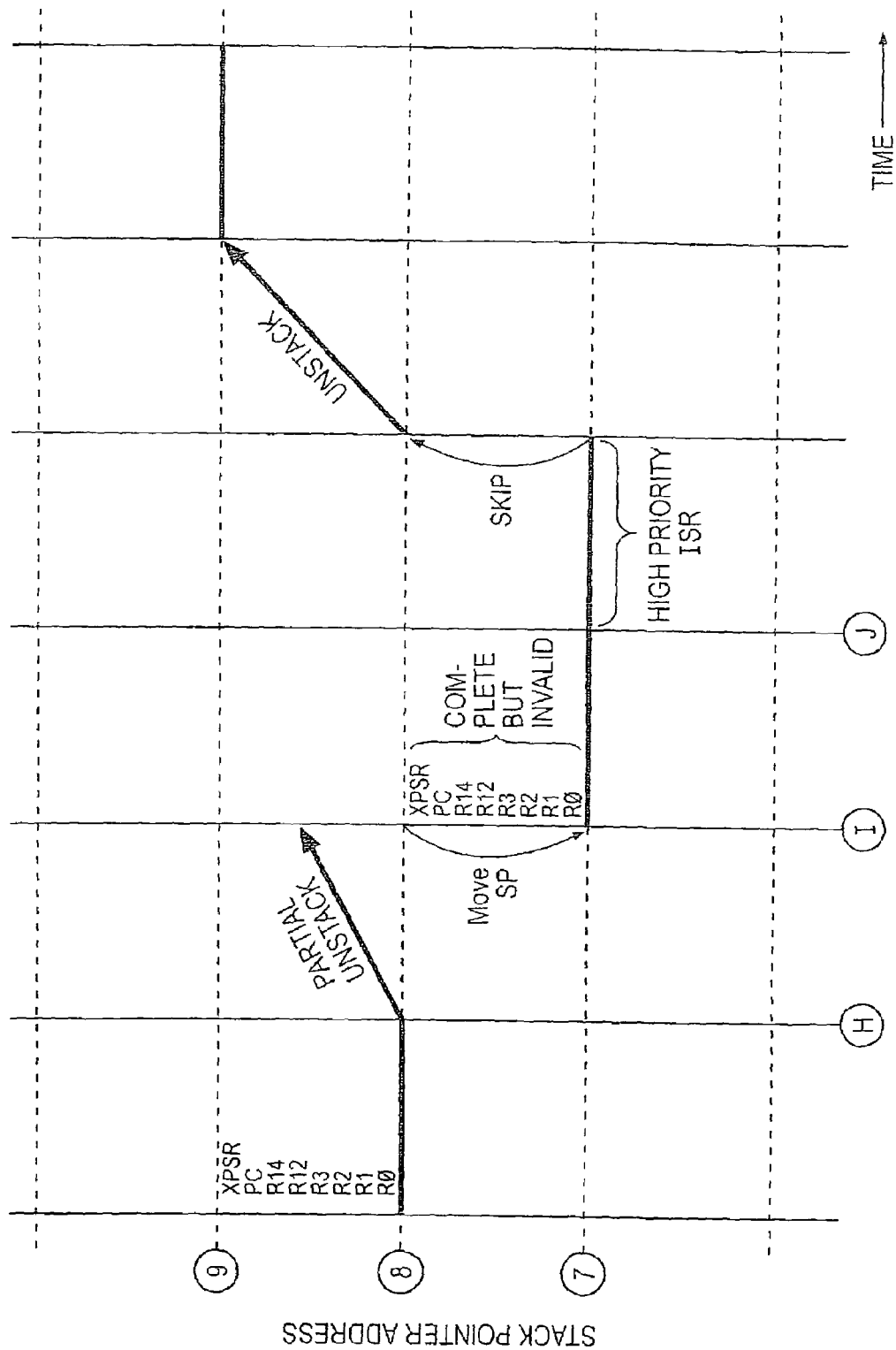

Alternatively, as illustrated in FIGS. 4C and 4D, the high priority interrupt may be received by the processor core whilst performing an interrupt exit unstacking process. In this example an interrupt routine corresponding to a low priority interrupt has completed at time H and the processor core begins an interrupt exit unstacking process, returning register values from the data stack to the registers 40. At the completion of the interrupt routine (the interrupt return) the stack pointer is at address 8. The high priority interrupt is received at time I when the unstacking has only partly completed. In the example of FIG. 4C, this can be seen by the stack pointer having only reached memory address 9'. In the example of FIG. 4D, only some of the register values have been unstacked ("partial unstack"). The processor core at time I immediately starts a new interrupt entry stacking process initiated by the high priority interrupt returning the stack pointer to memory address 8 and transferring the full set of register values to the data stack, completing this process at time J. Once more, the interrupt latency is kept constant (from time I to time J). By the end of the interrupt entry stacking process (incrementally in FIG. 4C/in one initial step in FIG. 4D) at time J the SP is at memory address 7.

It must be noted that the new data stack frame stored between memory addresses 7 and 8 for the high priority interrupt is itself invalid, because the processor core registers were in an indeterminate state, since only part of the full set of register values had been returned to the registers 40 by the time the high priority interrupt was received. This fact was known as the new data stack frame was being written, so the processor core makes use of the space in some of the 32-bit register values (e.g. XPSR or PC) to label the data stack frame written between memory addresses 7 and 8 as invalid. Thus, the interrupt latency for the high priority interrupt has been preserved, but the data stack frame written during that time period is invalid and once the interrupt routine corresponding to the high priority interrupt (which begins at time J) has completed the processor core will skip the data stack frame written between memory addresses 7 and 8 and begin again unstacking the data stack frame above memory address 8 (as illustrated in FIG. 4D), i.e. beginning again the interrupt exit unstacking process which it abandoned when the high priority interrupt was received.

Figure 5A:
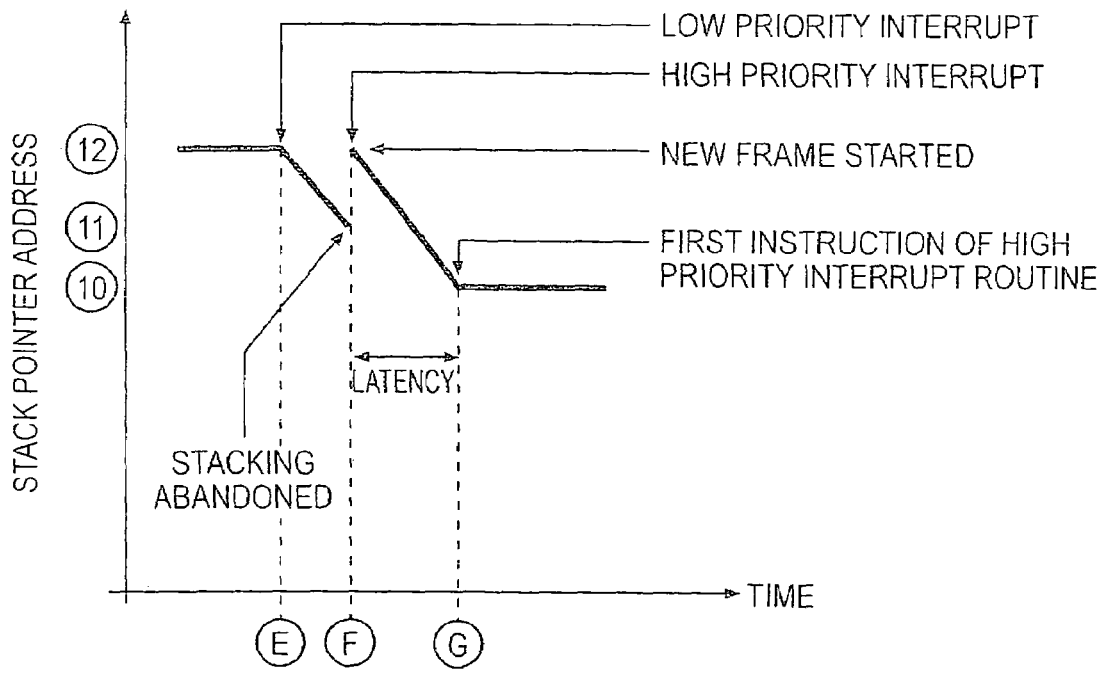
Figure 5C:
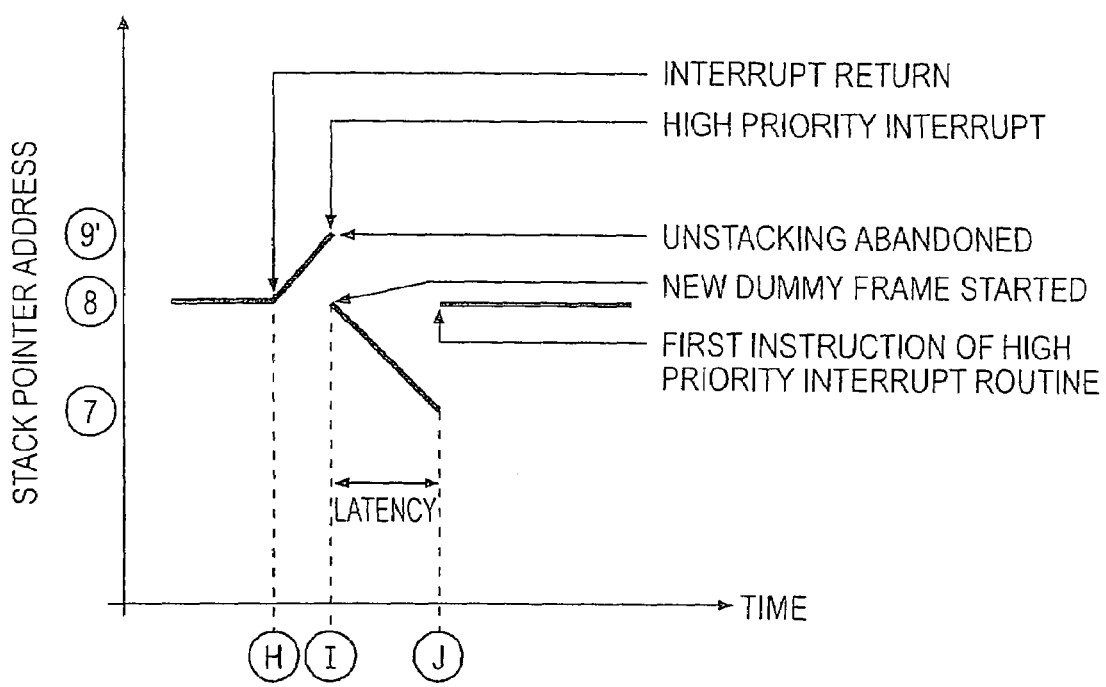
Figure 5B:
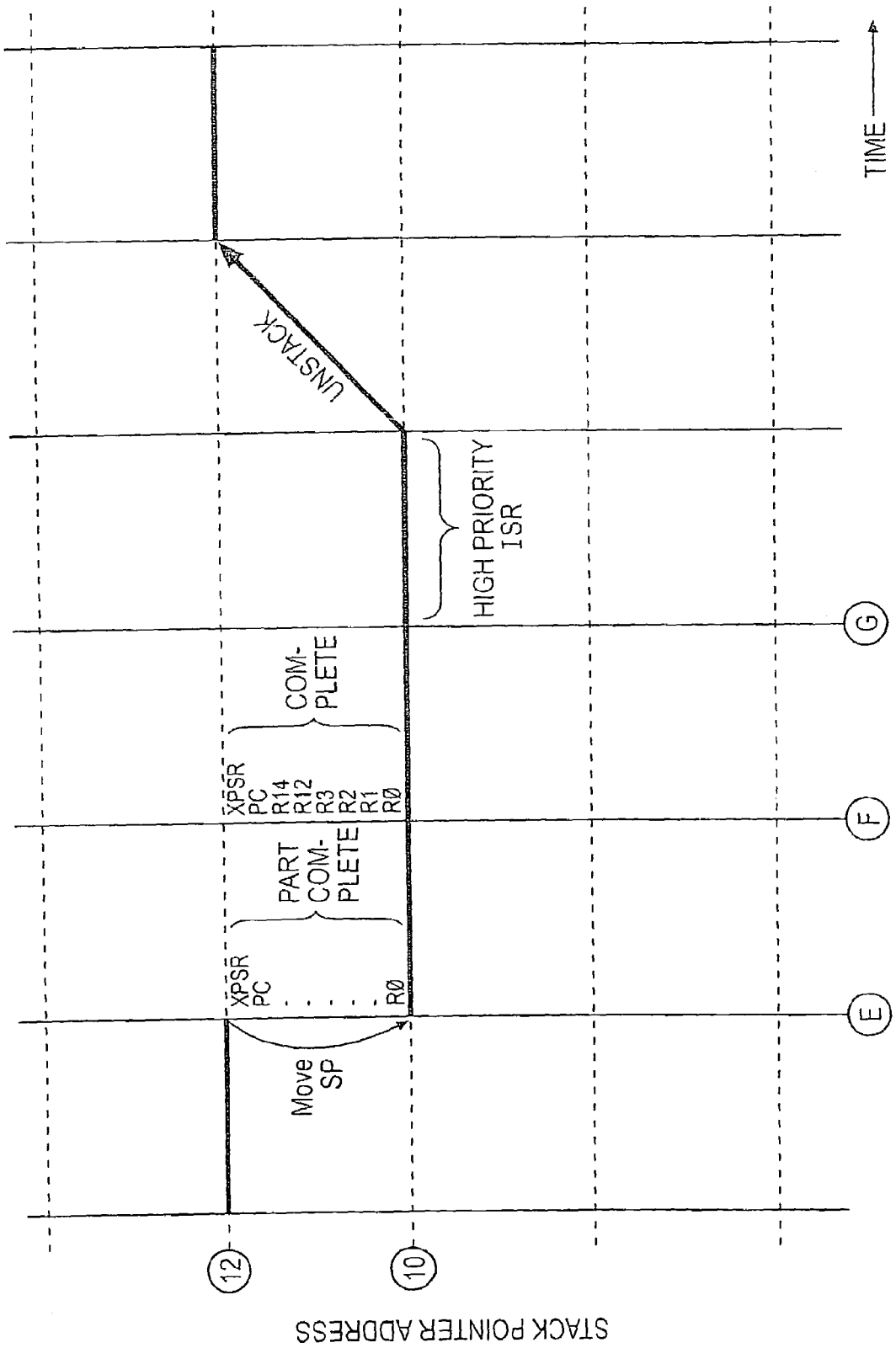

An alternative embodiment of the present invention is illustrated in FIGS. 5A-5F. This embodiment is described as the "enforced restacking" method, as opposed to the "stack frame tagging" method illustrated in FIGS. 4A-4D. In FIGS. 5A and 5B, like in FIGS. 4A and 4B, a high priority interrupt is received whilst the processor is performing an interrupt entry stacking process, the high priority interrupt being received at time F by which time the interrupt entry stacking process is only part-complete. In the example of FIG. 5A, this can be seen by the stack pointer having only reached memory address 11. In the example of FIG. 5B, it can be seen that only the values XPSR, PC and R0 have been transferred. When the high priority interrupt is received the processor core abandons the interrupt entry stacking process initiated by the low priority interrupt (as in the stack frame tagging method), but returns the stack pointer to memory address 12 and begins the new interrupt entry stacking process for the high priority interrupt there, thus overwriting the part-complete data stack frame, and writing a full data stack frame between addresses 12 and 10. The interrupt entry stacking process initiated by the high priority interrupt completes at time G, again preserving the interrupt latency (between time F and time G) for the high priority interrupt. When the interrupt routine corresponding to the high priority interrupt has completed the processor core unstacks the register values stored between memory addresses 10 and 12 from the data stack to the registers 40.

Figure 5D:
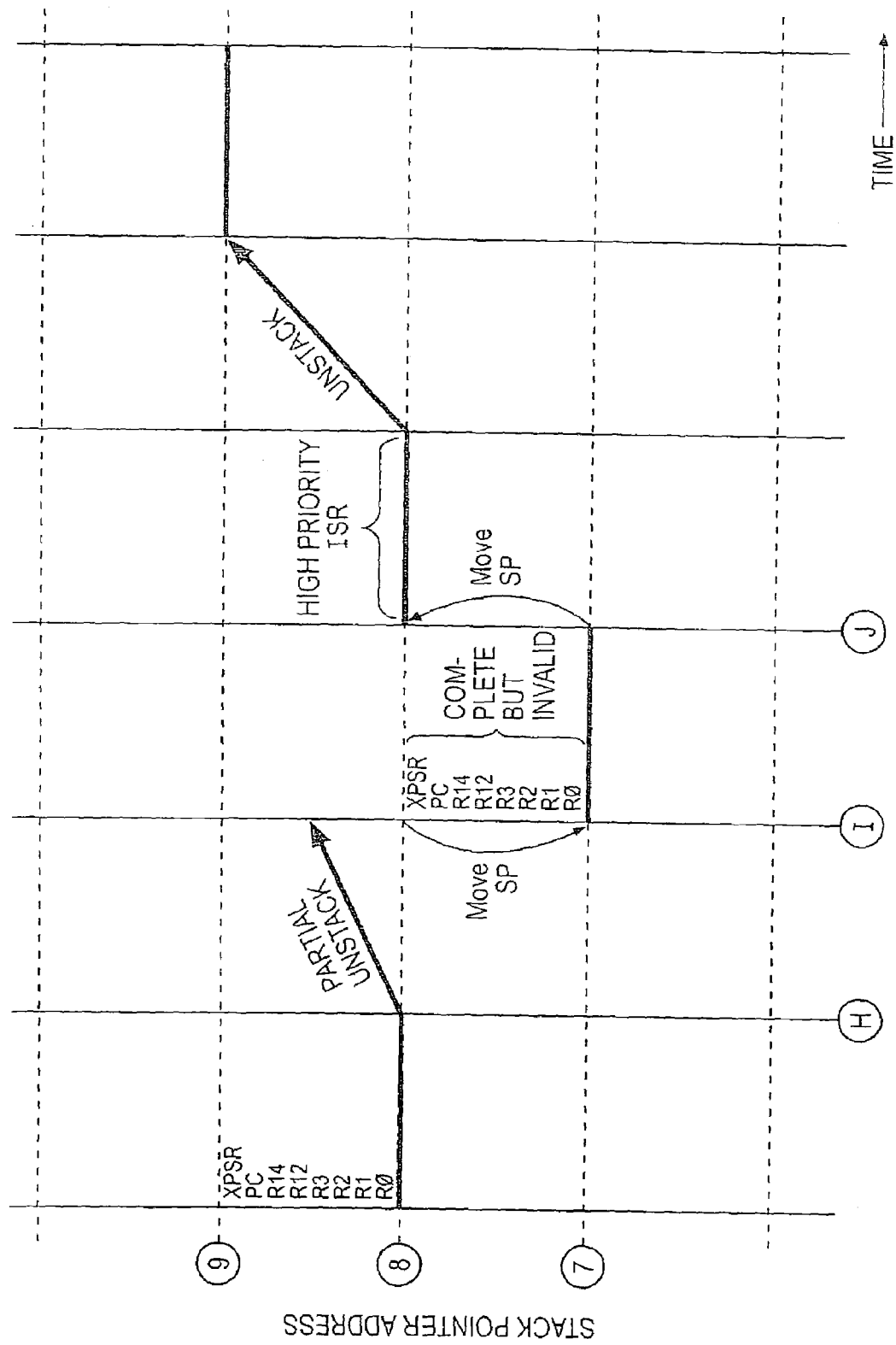

In FIGS. 5C and 5D, like in FIGS. 4C and 4D, the processor core returns from a low priority interrupt routine at time H and is part-way through performing an interrupt exit unstacking process at time I when a higher priority interrupt is received. At the completion of the interrupt routine (the interrupt return) the stack pointer is at address 8. The high priority interrupt is received at time I when the unstacking has only partly completed. In the example of FIG. 5C, this can be seen by the stack pointer having only reached memory address 9'. In the example of FIG. 5D, only some of the register values have been unstacked ("partial unstack"). The processor core at time I then abandons the unstacking process, returning the stack pointer to memory address 8, and initiates a new interrupt entry stacking process writing a data stack frame between memory addresses 8 and 7. This completes at time J.

Once more, the interrupt latency is kept constant (from time I to time J). By the end of the interrupt entry stacking process (incrementally in FIG. 5C/in one initial step in FIG. 5D) at time J the SP is at memory address 7.

As noted with reference to FIGS. 4C and 4D, the new data stack frame stored between memory addresses 7 and 8 for the high priority interrupt is itself invalid, due to the abandoned partially complete unstacking process. This fact was known as the new data stack frame was being written and on completion of the stacking process at time J the processor core returns the stack pointer to memory address 8 as the first instruction of the higher priority interrupt routine is executed. Once the high priority interrupt routine has completed the processor core begins an interrupt exit unstacking process, unstacking the valid data frame above memory address 8.

Figure 5E:
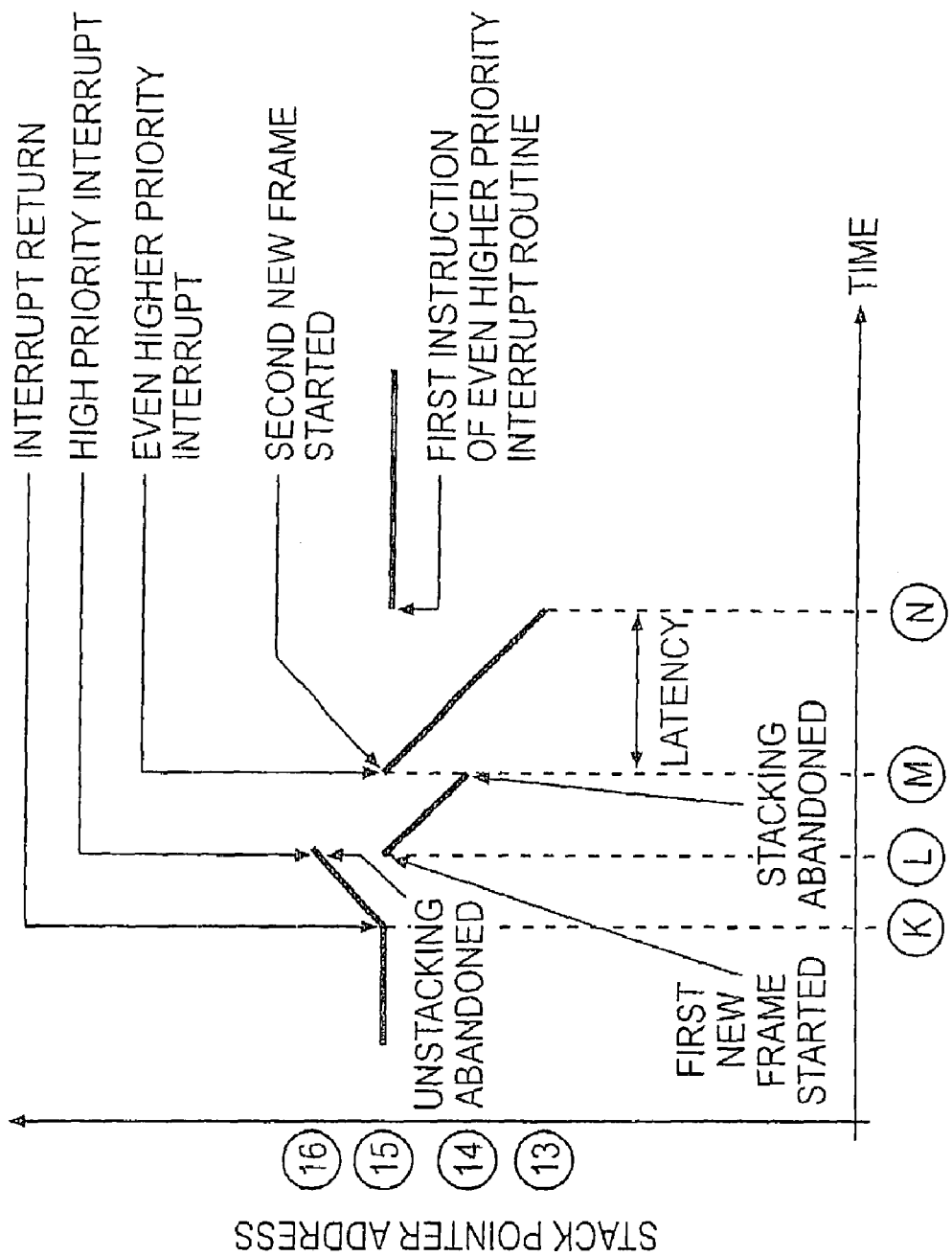
FIGS. 5E and 5F are time graphs schematically illustrating the development of a data stack when a high priority interrupt is received during an unstacking process initiated by a interrupt return, the stacking process initiated by the high priority interrupt being interrupted by an even higher priority interrupt.
Figure 5F:
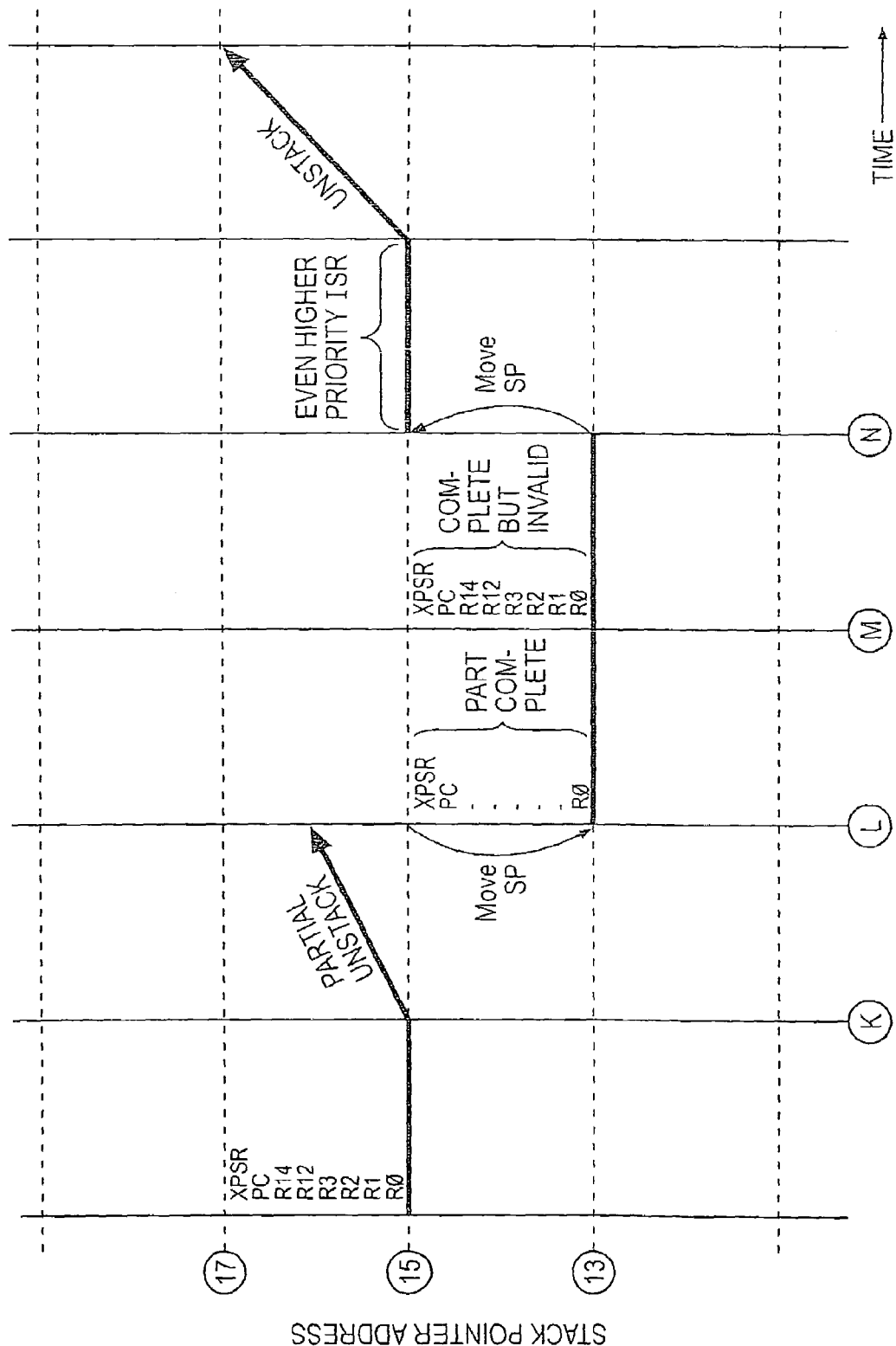

A final variation on the "enforced restacking" embodiment of the invention that should be considered is illustrated in FIGS. 5E and 5F. In this example, a first high priority interrupt occurs at time L whilst the processor core is part-way through performing an interrupt exit unstacking process which it began at time K. However, before the processor core can complete the new interrupt entry stacking process it began at time L in response to the high priority interrupt, an even higher priority interrupt is received at time M. Thus, similarly to in FIGS. 5A and 5B, the processor core returns the stack pointer to the memory address where the interrupted interrupt entry stacking process began (i.e. memory address 15) and begins a new interrupt entry stacking process at time M in response to the even higher priority interrupt signal. This completes at time N (thus preserving the interrupt latency—from time M to time N), but unlike in FIGS. 5A and 5B the data stack frame written between memory addresses 13 and 15 is in this example invalid, because of the abandoned interrupt exit unstacking process that preceded it. Hence, at time N the processor core returns the stack pointer to memory address 15 as the first instruction of the even higher priority interrupt routine is executing, such that when the even higher priority interrupt routine completes the processor core can begin unstacking the valid data stack frame stored between memory addresses 15 and 17.

Figure 6A:
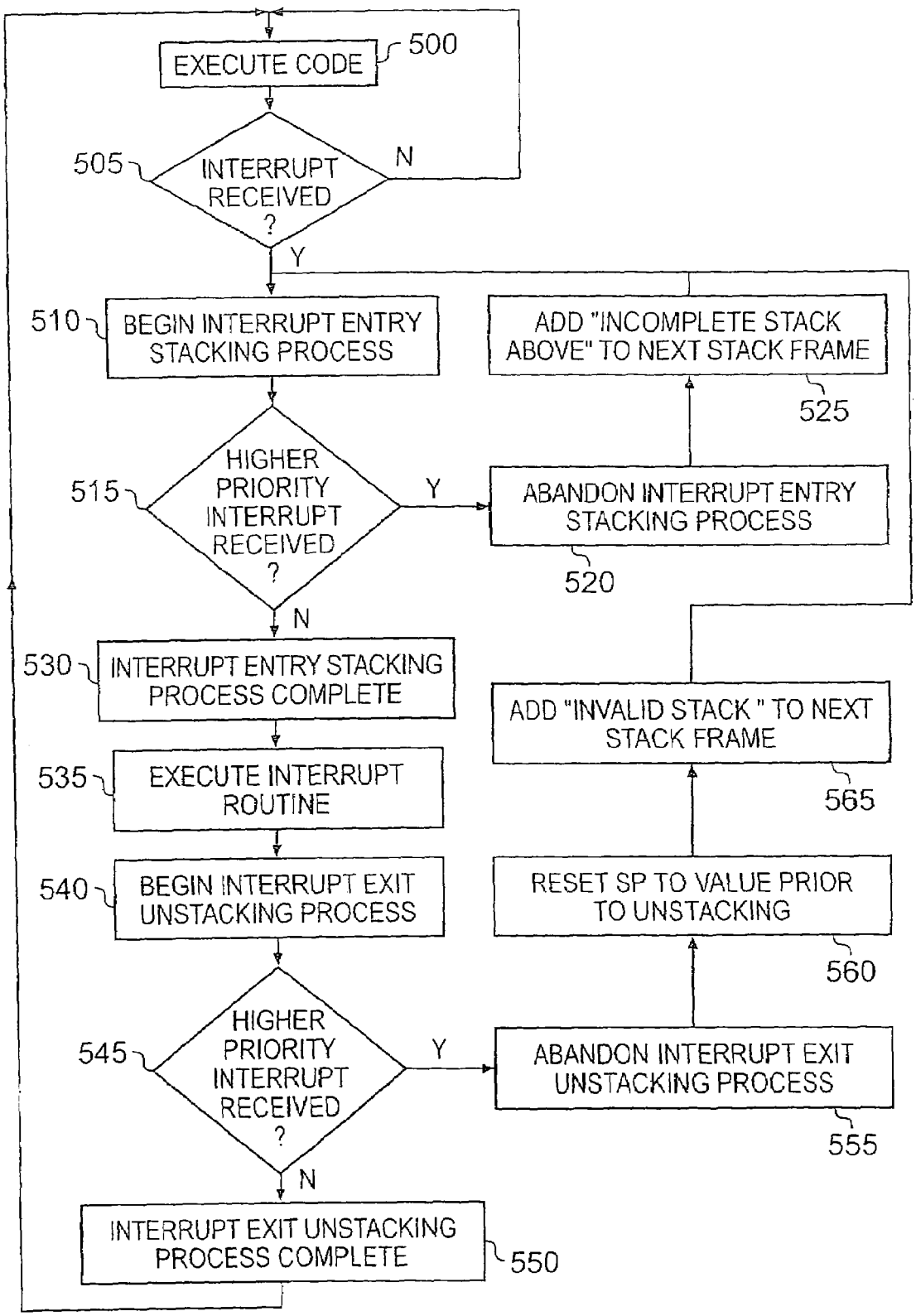
FIG. 6A is a flow diagram schematically illustrating part of the processing operations performed by a processing unit operating in accordance with the present techniques.

FIG. 6A illustrates an overview of the main steps involved in the data processing operations of a processor core according to the "stack frame tagging" embodiment of the invention (i.e. that illustrated in FIGS. 4A-4D). The flow begins at stage 500 where the processor core is executing program code. At stage 505 it is checked whether an interrupt signal has been received by the processor core 10. If it has not, then the flow returns to step 500 and program code execution continues until an interrupt signal is received.

When an interrupt signal is received the flow proceeds to step 510 where an interrupt entry stacking process is begun. Whilst the interrupt entry stacking process is being carried out it is continually checked (step 515) whether a higher priority interrupt has been received. If such a higher priority interrupt is received, then at step 520 the interrupt entry stacking process is abandoned and at step 525 the processor core sets a flag to ensure that the label "incomplete stack above" is added to the next stack frame it creates (as mentioned above, for example by adding additional data values to space in the XPSR or PC register values). The flow then returns to step 510 where a new interrupt entry stacking process is started, including adding the "incomplete stack above" label to the new stack frame created. If at step 515 a higher priority interrupt is not received whilst an interrupt entry stacking process is carried out, then the interrupt entry stacking process is complete at step 530. At step 535 the interrupt routine corresponding to the interrupt for which the stacking process has just completed at step 530 is carried out. It should be noted here that the execution of this interrupt routine can itself be interrupted by an interrupt of even higher priority and hence within step 535 a flow diagram commencing again at step 500 can be nested. However for simplicity in the example illustrated it is assumed that the interrupt routine completes without itself being interrupted.

Once the interrupt routine has completed at step 540, the processor core begins an interrupt exit unstacking process returning register values from the data stack to the registers 40. If the processor encounters the labels "invalid stack" or "incomplete stack above" when unstacking, then that stack (for "invalid stack") or the next stack above (for "incomplete stack above") is skipped (see FIGS. 4B and 4D).

At step 545 it is checked whether whilst doing this a higher priority interrupt is received. If not, then at step 550 the interrupt exit unstacking process is complete and normal program execution continues at step 500 executing program code. However, if at step 545 it is established that a higher priority interrupt is received, then at step 555 the interrupt exit unstacking process is abandoned and at step 560 the stack pointer is reset to the value it had immediately prior to the interrupt exit unstacking process. Finally, at step 565 the processor core sets a flag to add the label "invalid stack" to the next stack frame it creates. This then happens when the flow returns to step 510 and a new interrupt entry stacking process begins.

Figure 6B:
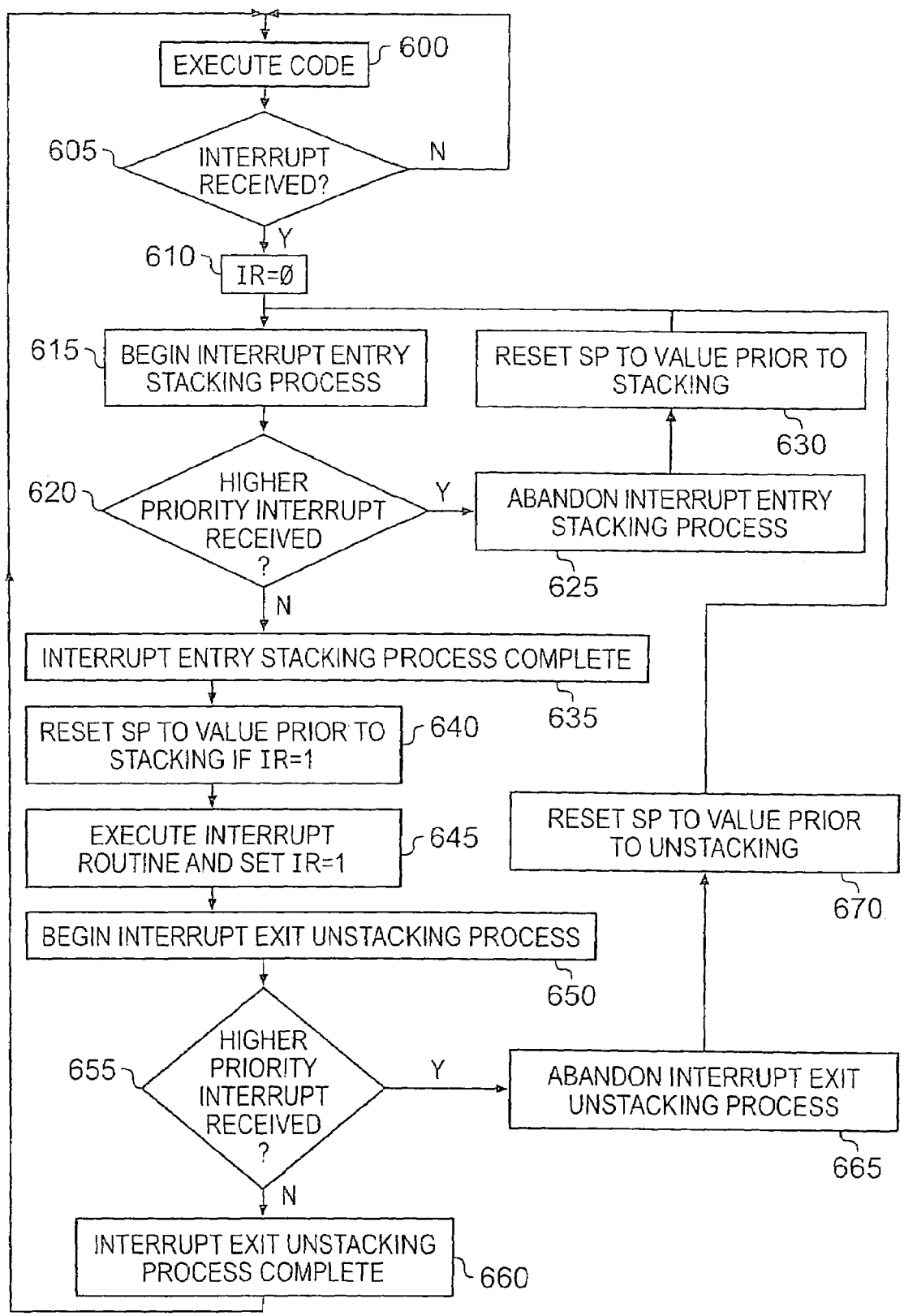
FIG. 6B is a flow diagram schematically illustrating part of the processing operations performed by a processing unit operating in accordance with the present techniques.

An overview of the series of steps carried out by the processor core in the "enforced restacking" embodiment of the invention (i.e. that illustrated in FIGS. 5A-5F) is illustrated in FIG. 6B. The flow begins at step 600 where the processor core is executing program code. At step 605 it is continually checked whether an interrupt has been received, and if not, the flow returns to step 600 and program code execution continues until an interrupt is received. When an interrupt is received the flag IR is set to 0 (indicating that the processor core is not returning from an interrupt).

At step 615 an interrupt entry stacking process is begun in response to the received interrupt. At step 620 whilst the interrupt entry stacking process is in progress it is continually checked whether a higher priority interrupt has been received. If such a higher priority interrupt is received, then at step 625 the interrupt entry stacking process is abandoned and at step 630 the SP is reset to the value it had immediately prior to the interrupt entry stacking process beginning. The flow then returns to step 615 where a new interrupt entry stacking process is begun.

If at step 620 a higher priority interrupt is not received whilst the interrupt entry stacking process is in progress then at step 635 the interrupt entry stacking process is complete. Then, at step 640, if the flag IR equals 1 then the stack pointer is reset to the value it had immediately prior to the interrupt entry stacking process that has just completed at step 635. Then at step 645 execution of the interrupt routine corresponding to the highest priority interrupt received is carried out and the flag IR is set to 1. As noted with regard to FIG. 6A, here also the execution of this interrupt routine can itself be interrupted by an interrupt of even higher priority and hence within step 645 a flow diagram commencing again at step 600 can be nested. However for simplicity in the example illustrated it is assumed that the interrupt routine completes without itself being interrupted.

Then, once the interrupt routine has completed at step 650, an interrupt exit unstacking process is begun by the processor core returning register values from the data stack to the registers 40. At step 655 it is continually checked whether a higher priority interrupt is received and if not then at step 660 the interrupt exit unstacking process completes and the flow returns to step 600 executing program code. However, if at step 655 a higher priority interrupt is received during the interrupt exit unstacking process, then at step 665 the interrupt exit unstacking process is abandoned and at step 670 the stack pointer is reset to the value it had immediately prior to beginning the interrupt exit unstacking process and the flow returns to step 615.

Thus according to an embodiment of the present invention, there is disclosed a data processing apparatus comprising a processing unit which is responsive to a plurality of interrupt signals to carry out a corresponding interrupt routine. On receipt of an interrupt signal, the processing unit stores data values from a plurality of registers onto a data stack and carries out the corresponding interrupt routine. Thereafter the processor returns the data values from the data stack to the registers and carries on the processing it was performing when the interrupt was received. If a higher priority interrupt is received whilst the processor is transferring register values to or from the data stack, that transferral is abandoned and the processing unit immediately begins transferring data values from the registers to the data stack in response to the higher priority interrupt. The interrupt latency for the higher priority interrupt is thus preserved.

Although illustrative embodiments of the invention have been described in detail herein with reference to the accompanying drawings, it is to be understood that the invention is not limited to those precise embodiments, and that various changes and modification can be effected therein by one skilled in the art without departing from the scope and spirit of the invention as defined by the appended claims. For example, various combinations of the features of the following dependent claims could be made with the features of the independent claims without departing from the scope of the present invention.

I claim:

1. A data processing apparatus comprising:
   a processing unit for processing data;
   a plurality of registers; and
   a data stack;
   said processing unit being responsive to each of a plurality of interrupt signals to carry out a corresponding interrupt routine;
   wherein on receipt of an interrupt signal, said processing unit is configured to begin an interrupt entry stacking process comprising storing on said data stack a plurality of data values indicative of a state of said processing unit stored in said plurality of registers;
   wherein on completion of an interrupt routine, said processing unit is configured to begin an interrupt exit unstacking process comprising returning said plurality of data values from said data stack to said plurality of registers;
   wherein in response to a further higher priority interrupt signal received whilst performing either said interrupt entry stacking process or said interrupt exit unstacking process, said processing unit is configured to abandon said interrupt entry stacking process or said interrupt exit unstacking process, and to begin a further interrupt entry stacking process comprising storing on said data stack a further plurality of data values stored in said plurality of registers.

2. A data processing apparatus as claimed in claim 1, wherein said data stack is a dedicated first-in last-out buffer.

3. A data processing apparatus as claimed in claim 1, wherein said data processing apparatus further comprises a memory and said data stack is embodied in a portion of said memory.

4. A data processing apparatus as claimed in claim 1, wherein said data processing apparatus further comprises a data stack pointer register for storing a data stack pointer indicative of a current top of said data stack.

5. A data processing apparatus as claimed in claim 1, wherein said interrupt entry stacking process further comprises storing additional data values in association with said plurality of data values stored on said data stack, said plurality of data values stored on said data stack comprising a data stack frame, said additional data values being indicative of a data stack frame validity.

6. A data processing apparatus as claimed in claim 1, wherein said processing unit is operable to begin said further interrupt entry stacking process at a point in said data stack which said interrupt entry stacking process had reached when said further higher priority interrupt signal was received.

7. A data processing apparatus as claimed in claim 1, wherein said processing unit is operable to begin said further interrupt entry stacking process at a point in said data stack where said interrupt entry stacking process began.

8. A data processing apparatus as claimed in claim 1, wherein said processing unit is operable to begin said further interrupt entry stacking process at a point in said data stack where said interrupt exit unstacking process began.

9. A data processing apparatus as claimed in claim 1, wherein said interrupt signal is generated externally to said processing unit.

10. A data processing apparatus as claimed in claim 1, wherein said interrupt signal is generated as a direct effect of processing data.

11. A data processing apparatus as claimed in claim 1, wherein said interrupt signal is generated as a side-effect of processing data.

12. A data processing apparatus as claimed in claim 5, wherein said data stack frame validity indicates the validity of said data stack frame.

13. A data processing apparatus as claimed in claim 5, wherein said data stack frame validity indicates the validity of an adjacent data stack frame adjacent to said data stack frame.

14. A data processing apparatus as claimed in claim 5, wherein said additional data values indicative of a data stack frame validity indicate an invalid data stack frame and said processing unit is operable during said interrupt exit unstacking process to skip said invalid data stack frame.

15. A data processing apparatus as claimed in claim 5, wherein said additional data values indicative of a data stack frame validity indicate an incomplete data stack frame and said processing unit is operable during said interrupt exit unstacking process to skip said incomplete data stack frame.

16. A data processing apparatus as claimed in claim 5, wherein said data processing apparatus further comprises a data stack pointer register for storing a data stack pointer indicative of a current top of said data stack, wherein on completion of said further interrupt entry stacking process, if said further higher priority interrupt signal was received whilst performing said interrupt exit unstacking process, said processing unit is configured to alter said data stack pointer to indicate where said further interrupt entry stacking process began.

17. A data processing apparatus as claimed in claim 5, wherein said data processing apparatus further comprises a data stack pointer register for storing a data stack pointer indicative of a current top of said data stack, wherein on completion of said further interrupt entry stacking process, if said further higher priority interrupt signal was received whilst performing said interrupt entry stacking process, said interrupt entry stacking process having resulted from a preceding higher priority interrupt signal having been received whilst performing said interrupt exit unstacking process, said processing unit is configured to alter said data stack pointer to indicate where said further interrupt entry stacking process began.

18. A method of operating a data processing apparatus, comprising the steps of:
  processing data using a processing unit having a plurality of registers;
  responding to each of a plurality of interrupt signals to carry out a corresponding interrupt routine;
  on receipt of an interrupt signal, said processing unit beginning an interrupt entry stacking process comprising storing on a data stack a plurality of data values indicative of a state of said processing unit stored in said plurality of registers;
  on completion of an interrupt routine, said processing unit beginning an interrupt exit unstacking process comprising returning said plurality of data values from said data stack to said plurality of registers;
  in response to a further higher priority interrupt signal received whilst performing either said interrupt entry stacking process or said interrupt exit unstacking process, said processing unit abandons said interrupt entry stacking process or said interrupt exit unstacking process, and begins a further interrupt entry stacking process comprising storing on said data stack a further plurality of data values stored in said plurality of registers.

* * * * *